United States Patent [19]

Branchick et al.

[11] 4,399,020
[45] Aug. 16, 1983

[54] DEVICE FOR WASTE WATER TREATMENT

[75] Inventors: Kenneth J. Branchick, Mentor; Irving Malkin, University Hts.; Robert C. Sutter, Painesville; Karel A. Korinek, Mentor, all of Ohio; Mary R. Suchanski, Rochester, N.Y.; Donald M. Knaack, Mentor; Gary F. Platek, Willoughby Hills, both of Ohio

[73] Assignee: Diamond Shamrock Corporation, Dallas, Tex.

[21] Appl. No.: 286,551

[22] Filed: Jul. 24, 1981

[51] Int. Cl.³ .................... C25C 7/00; C25C 7/02; C25C 7/04
[52] U.S. Cl. .................... 204/269; 204/275; 204/279; 204/284; 204/288; 204/290 R; 204/290 F; 204/292; 204/294; 204/DIG. 13
[58] Field of Search .......... 204/269, 275–278, 204/242, 149, 288, 289, 284, 290 R, 292, 293, 294, DIG. 13, 279

[56] References Cited

U.S. PATENT DOCUMENTS

| | | | |
|---|---|---|---|
| 1,303,627 | 5/1919 | Baines | 204/242 X |
| 2,616,165 | 11/1952 | Brennan | 204/290 R |
| 3,674,675 | 7/1972 | Leaman | 204/290 R |
| 3,966,567 | 6/1976 | Pace et al. | 204/275 X |
| 3,977,951 | 8/1976 | Lopez-Cacicedo | 204/275 X |
| 4,133,738 | 1/1979 | Will | 204/294 |
| 4,224,133 | 9/1980 | Takahashi | 204/292 X |

Primary Examiner—Donald R. Valentine
Attorney, Agent, or Firm—Woodrow W. Ban; John P. Hazzard

[57] ABSTRACT

This invention is directed to a membrane or diaphragm-free electrolytic cell device for removal of a metal(s) present as a contaminant(s) in waste water comprising a nonconductive cell box having an upper peripheral flange, anode and cathode bus bars located on said cell box below said flange, inlet and outlet means to pass the liquid through the electrodes contained in said box, means to space the anodes and cathodes contained within said cell box, a plurality of anodes having openings to permit the flow of waste water therethrough, a plurality of reticulate cathodes, and means connecting the anodes and cathodes, respectively, to said bus bars and to a source of electrical energy whereby the metal contaminant(s) present in such water are deposited on the reticulate cathodes predominantly.

14 Claims, 16 Drawing Figures

FIG. 2 METAL CONCENTRATION VS. RETICULATE CATHODE NUMBER FOR THE ACID COPPER AND CYANIDE ZINC RINSEWATER TREATMENT SYSTEMS

FIG. 3 CONCENTRATION VS. TIME FOR THE CADMIUM CYANIDE TREATMENT SYSTEM

FIG. 4  METAL CONCENTRATION VS. TIME FOR THE WATTS NICKEL RINSEWATER TREATMENT SYSTEM

FIG. 5 COPPER CONCENTRATION VS. TIME FOR THE AMMONIACAL COPPER ETCHANT RINSEWATER TREATMENT SYSTEM

FIG. 6 COPPER CONCENTRATION VS. TIME FOR THE COPPER ELECTROLESS RINSEWATER TREATMENT SYSTEM

DEVICE FOR WASTE WATER TREATMENT

BACKGROUND OF THE INVENTION

This invention is directed to a device, viz., a membrane or diaphragm-free electrolytic cell device, for use in treating waste waters, particularly those resulting from metal plating operations and known as platers' rinse waters, to remove metal pollutants (and optionally also cyanide) therefrom prior to discharge of the treated effluent into streams, rivers, etc.

There is considerable and growing concern over pollution of the nations' waterways with various contaminants such as heavy metals, e.g., copper, nickel, zinc, mercury, cadmium, etc., and such nonmetallic contaminants as cyanide as well as complexes of the foregoing metals with cyanide, etc.

Many of these pollutants enter the nations' waters from industrial sources, such as metal finishing or plating plants and from mining sources. Environmental legislation and regulations, on the federal, state and local government levels, have set forth maximum allowable concentrations of these contaminants which may be discharged into public waters.

A clear and present need exists for an economical yet effective device for treating such waste waters to permit removal of a substantial portion of contaminants, especially with respect to platers' rinse water, which customarily contains one or more of such metals as copper, zinc, cadmium, alone or in combination with cyanide.

Various methods have been proposed or are reported to be available for use in removal of metals and/or cyanide from water.

One device for removing heavy metals from waste water is the apparatus set forth by Howard L. Recht in U.S. Pat. No. 3,954,594 which comprises an electrochemical cell provided with separate anode and cathode compartments, each containing a bed of electrically conductive particles. The compartments are separated by an electrically nonconductive foraminous member, e.g., a water-impermeable plastic, e.g., nylon, cellophane, or ceramic material, such as oxides of silicone, zirconium, tantalum, beryllium and mixtures thereof. Suitable electrically conductive particles for use in the anode compartment include graphite, tantalum, stainless steels, and the metals of Group VIII of the Periodic Table of the Elements. Suitable materials for the particles for use in the cathode compartment include copper, nickel, tin, zinc, silver and gold. The apparatus is disclosed in the patent as capable of removing heavy metal and cyanide pollutants from aqueous streams containing them.

U.S. Pat. No. 4,197,181 to C. Portal et al. is directed to a stationary particle bed dual electrode for electrowinning of metal values from solutions containing them. Each particulate bed electrode assembly comprises an electrically nonconductive support frame holding a perforated, electrically conductive flat distributor plate through which the solution to be treated flows. Attached to the side of the perforated distributor plated facing the internal cavity defining the stationary particulate bed is a coarse filter strainer. Each stationary particulate bed can be comprised of conductive, carbonaceous particles onto which the desired metal values deposit. An interface liner, e.g., synthetic filter cloth, is utilized on one side of the conductive, perforated distributor plate, and a polyurethane foam filter element is employed on the opposite side thereof. The interface liner is employed to discourage bonding of the particulate bed particles to the liner through the action of dendrites growing through the liner. The polyurethane filter element is utilized for flow distribution and elimination of any particulate material in the electrolyte solution before passing through the perforated plate.

U.S. Pat. No. 4,226,685 also issued to C. Portal et al. (represented to be a continuation-in-part application of U.S. Pat. No. 4,197,181) is directed to a method of treating plating wastes containing at least one heavy metal and (optionally) cyanide ions such that ionic contaminants are reduced to acceptably low concentrations, and the plated metals are available in a concentrated and thus retrievable form. This Portal et al patent appears to utilize the same apparatus as set forth in U.S. Pat. No. 4,197,181, viz., a stationary dual particulate bed apparatus utilizing dual electrodes with a central cavity and including filters for trapping particulate matters suspended in the plating wastes. In the sole example of U.S. Pat. No. 4,226,685, the inlet stream contained 150 parts per million of copper as cupric sulfate and 20 gallons of such solution was processed in 6 hours in 2 passes through the apparatus, each pass lasting 3 hours. The outcome of copper concentration as a result of the first pass was 33 parts per million and the outcome copper concentraiton as a result of the second pass was 15 parts per million.

U.S. Pat. No. 3,694,325 to S. Katz et al. is directed to a process for producing a 3-dimensional, reticulated electroform by first electrolessly then electrolytically depositing metal on a flexible tester-type polyurethane foam followed by heating the metallized foam to about 800° F. in an oxidizing environment, i.e., air, to decompose the polyurethane substrate, viz., pyrolyze it from the electroform. Then a second heat treatment, at higher temperatures, can be employed in a reducing atmosphere to anneal the pyrolyzed electroform. Although there is a statement at column, lines 1 to 2, that the substrate may or may not be removed after plating; the remaining portion of the specification, including all the specific detailed disclosure and the sole example requires the aforementioned pyrolysis of the polyurethane foam substrate.

An article entitled "IMPROVEMENT OF THE HIGH-RATE DISCHARGE BEHAVIOR OF THE NICKEL ELECTRODE" by Guy Crespy et al. appearing at pages 219 to 237 of the published Proceedings of the 11th International Symposium held at Brighton, September, 1978, and published at POWER SOURCES 7 (RESEARCH AND DEVELOPMENT IN NON-MECHANICAL ELECTRICAL POWER SOURCES) copyright 1979 by Academic Press, is directed to the utilization of a nickel foam-type electrode structure in alkaline batteries. The nickel foam-like structure is obtained by impregnating ether-type organic polymer foams, such as polyurethane foams, having most of their pores intercommunicating, with a nickel powder followed by heating the nickel powder-impregnated polyurethane foam at temperatures sufficiently high to effect the pyrolization of the polyurethane substrate. The pyrolysis is conducted by placing the nickle powder-impregnated foam in an oven under a very light pressure (approximately 2 grams cm$^{-2}$) while slowly raising the temperature under a reducing atmosphere until the organic material decomposes into volatile substances (up to 450° C.) and is quantitatively eliminated. The resulting powder is then sintered at temperatures of about 700° to 1000° C. Typical sintering conditions employed were 1000° C. for one hour. The resulting electrode substrates were then impregnated in a one-step cathodic precipitation of nickel hydroxides to impregnate the electrode with active material. The Crespy et al. nickel foam electrodes impregnated with nickel hydroxides are utilized in the so-called dry cell or storage batteries of the alkaline type.

An article "CHARACTERIZATION OF RETICULATE, THREE-DIMENSIONAL ELECTRODES" appearing in the JOURNAL OF APPLIED ELECTROCHEMISTRY 8 (1978) at pages 195 to 205 by A. Tentorio et al. is directed to the preparation of a reticulate electrode by first electrolessly then electrolytically depositing copper on a polyurethane foam substrate. This reticulate electrode is then assemblied in an electrolytic cell, as depicted in FIGS. 2 and 3 of said Tentorio et al. article at pages 199 and 200, respectively. Each such electrolytic cell is comprised of a reticulate cathode of the metallized polyurethane foam as set forth above and a counter electrode, e.g., made of copper (FIG. 1) or lead/lead dioxide (FIG. 3) with an ion exchange membrane. The purpose of the ion exchange membrane is to separate the anolyte and catholyte feeds. At page 205 of the Tentorio et al. article, the authors observe that the cell of FIG. 3 could operate in waste water treatment only with multiple-pass electrolysis and that the level of concentration of pollutant after treatment should not be below tens of parts per million in order not to weigh down excessively the recycle.

The electrolytic waste water treatment device of this invention enables the removal of metal from platers' rinse water with or without recycling. It offers a more direct treatment procedure in that the present device does not require the use of an ion exchange membrane to separate the anolyte and catholyte. Additionally, the present cell provides a system whereby the solution to be treated flows through one compartment in each cell. The cell system is flexibly designed to accommodate any type of anode, e.g., graphite, DSA, lead, aluminum, etc., and reticulate cathode.

The device is of simple construction and therefore inexpensive. The cell provides ready access to the cathodes so that they can be quickly and easily removed. The device allows for introduction of fresh cathodes at the rear of the electrode pack while moving forward those electrodes which previously were in the rear of the pack so that they may be fully plated. This allows for more efficient use of the cathodes, thus reducing the cost of operation. Additionally, the metal plated cathode structures can be recovered and sold for scrap. This scrap metal from the loaded cathode structure is routinely in a +99 percent pure form for treatments in which only one metal contaminant exist in the effluent stream. The metal contaminants, copper, cadmium, nickel, zinc, silver, gold, can be removed routinely from the inlet solution of approximately 150 ppms producing an outlet solution of approximately 15 ppms in the single pass mode in which a cell of 50 copper reticulate cathodes and 51 anodes of the graphite or DSA type are employed. In a recycling system, cyanide can be oxidized to cyanate while concurrent metal removal is occurring at the copper reticulate cathode. The cyanide can be oxidized routinely from the inlet solution of approximately 150 ppms producing an outlet solution of approximately 10 ppms cyanide and approximately 220 ppms cyanate. This concurrent system is utilized at highly alkaline pH, viz., at pH values ranging from above about 11, e.g., from about 11+ to about 13.

BRIEF DESCRIPTION OF THE DRAWINGS

The invention will be understood further in conjunction with the accompanying drawings.

DETAILED DESCRIPTION OF THE INVENTION

Figure 1:
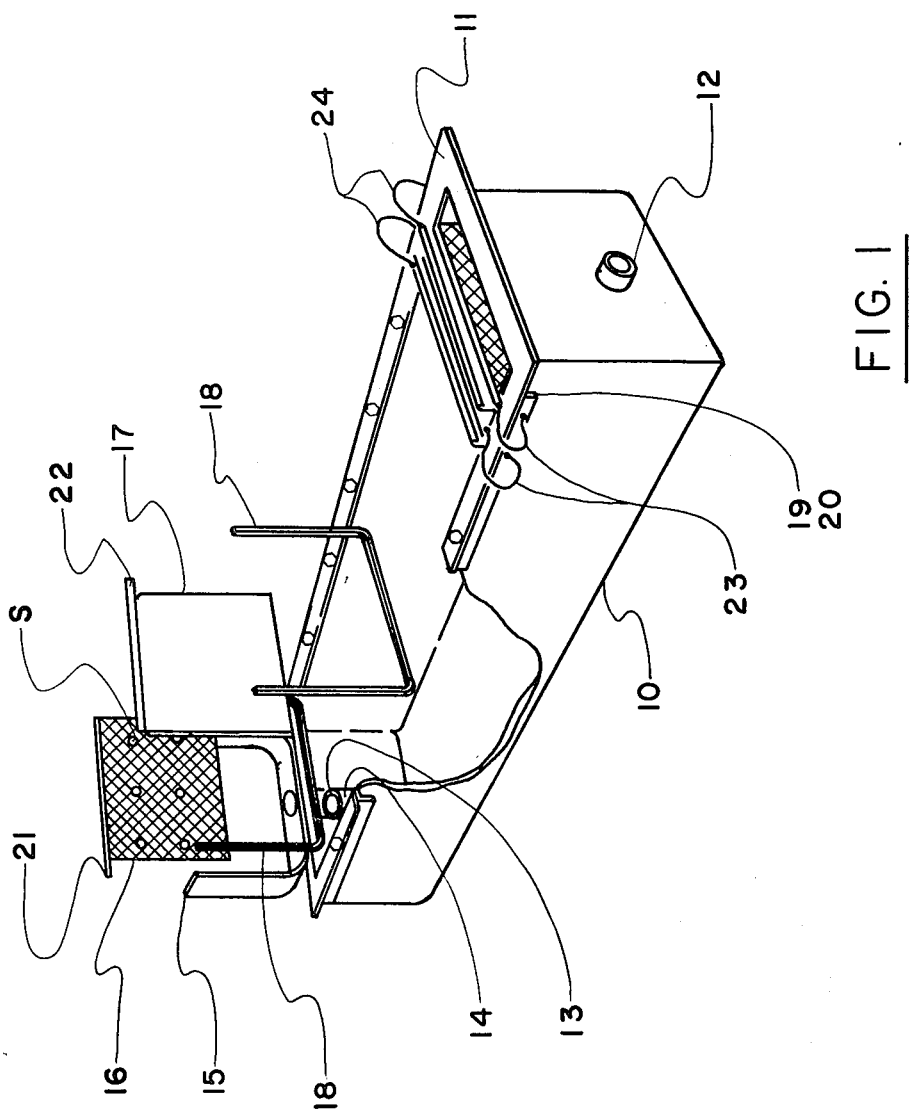
FIG. 1 is an isometric view with parts of the cell of this invention in elevation.

As shown in FIG. 1, cell box 10, which can be made of "ROTOMOLDED" cross-linked polyethylene, polypropylene, or other equivalent plastic material, has an upper flange 11 therearound. Plastic, e.g., polyvinyl chloride, inlet nozzle 12 and outlet nozzle 13, arising from standpipe 14 permit ingress and egress of the waste water to be treated by the cell. Endspacers 15 of polyvinyl chloride or equivalent nonconductive material are present at either end of the cell box. As noted in the figure, endspacer 15 at one end of the cell box fits over standpipe 14. Anodes 16, whih may be of the dimensionally stable type, are separated from reticulate metallized organic polymer foam cathodes 17 at their outer periphery by nonconductive intermediate spacers 18 which may be made from polyvinyl chloride or equivalent plastic material. Plastic, e.g., nylon isolator snaps S (known in the art) can be used to aid in separating the main body portions of anodes 16 from the cathodes 17. Anode busbar 19 is shown positioned on one undersurface of cell box flange 11 and correspondingly cathode busbar 20 can be positioned similarly on another, e.g., the opposite undersurface of the flange 11. Anode contact bars 21 with extensions are positioned on the upper portion of anodes 16 to effect contact with the respective anode busbar 19 and correspondingly cathode contact bars 22 with extensions are positioned in the upper portion of cathodes 17 to serve as a means for electrical connection with cathode busbar 20. When metallized organic polymer foam reticulate cathodes are employed, generally U-shaped sheet metal, e.g., galvanized sheet cathode contact bars 22 are used and secured to the upper portions of said reticulate cathodes by slipping them over said cathodes and pinching or pressing said sheets at selected portion(s) of or across their entire length(s) so as to hold the upper portions of said reticulate cathodes securely fastened. Respective anode terminal connectors 23 and cathode terminal connectors 24 are utilized to achieve the connection of the anode contact bars with the anode busbar and the cathode contact bars with the cathode busbar, respectively. A cell cover plate (not shown) can be utilized to effect closure of the electrolytic cell. Such a cell cover plate is not required, however. The device of this invention can be used to conduct the metal and/or concurrent metal removal-cyanide destruction process(es) described and claimed in copending U.S. patent application Ser. No. 286,565 filed in the names of Kenneth J. Branchick, Irving Malkin and Mary R. Suchanski of even date herewith and entitled "Metal Removal Process."

CELL AND ELECTRODE VARIATIONS

Figure 7:
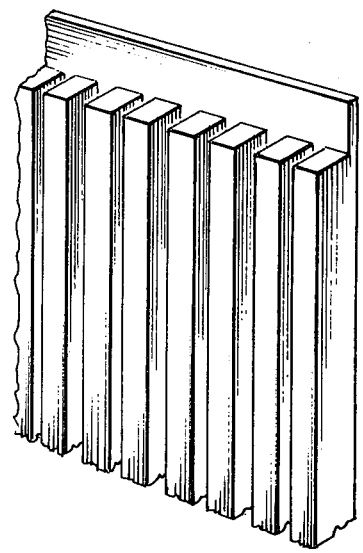
FIGS. 7-14 are drawings illustrating various construction details of optional parts and accessories adapted for use in cell box 10, such as electrodes (FIGS. 9 and 10), spacers (FIGS. 7, 8 and 11), and electrical connectors (FIGS. 12-14).
Figure 8:
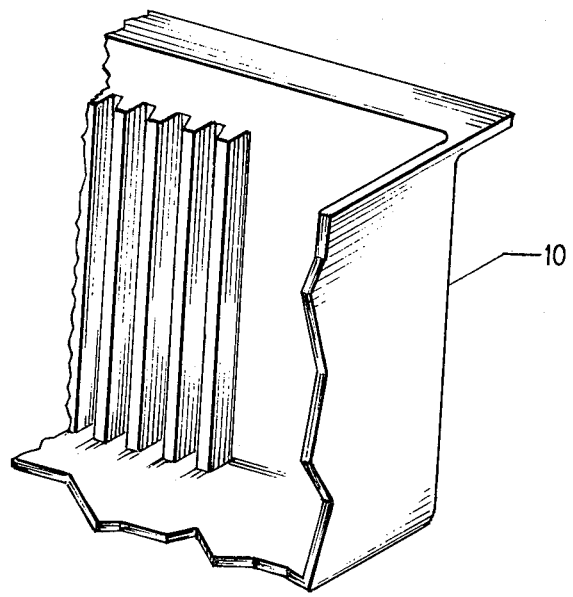

Grooved or slotted side and/or bottom inserts can be employed in cell box 10 to accommodate the ready insertion and removal of the electrodes. Alternatively cell box 10 can be molded so as to have grooved or slotted configurations of the cell box sides and/or bottom for the same purpose. In either case, end spacers 15 and intermediate spacers 18 can be eliminated. See FIG. 7 which illustrates the grooved or slotted inserts and FIG. 8 which depicts the molding of cell box 10 with the appropriate grooves or slots.

As noted above, cell box 10 can be provided with a cover plate (not shown). Preferably such cell cover plate is flat or substantially concave (one viewed from above) or of equivalent configuration so as to permit flow of any gases accumulating within the cell upwardly. Such cover plate assist in preventing the accumulation of gases, e.g., hydrogen, chlorine, oxygen, etc., which may be hazardous, nauseous or explosive either singularly or in combination.

Figure 9A:
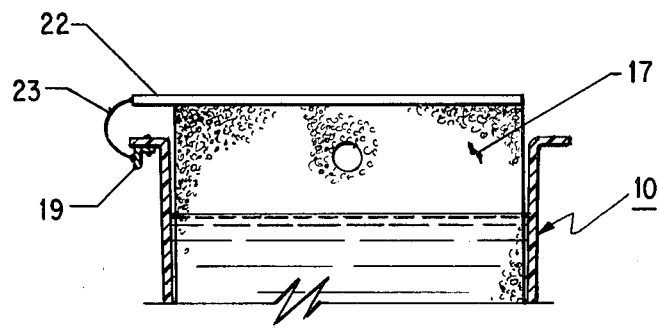
Figure 9B:
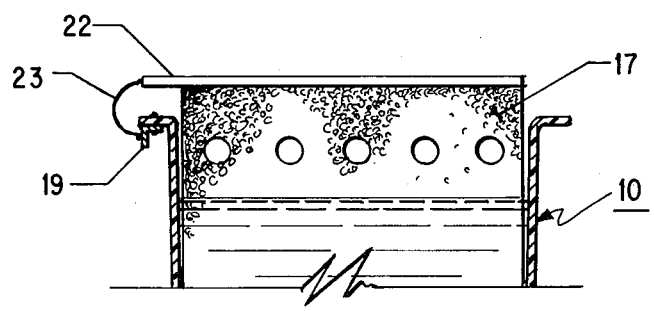
Figure 9C:
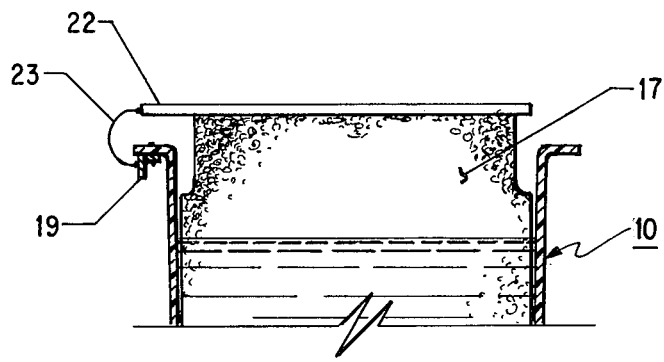

A notch(es), preferably in one or both of the upper corners, or a hole(s) in one, more or all of the cathodes, said notch(es) or hole(s) being located above the normal liquid level in the cell, can be provided to prevent cell overflow in the event of cathode blockage. Such openings (holes) are of larger size than the pores of the reticulate electrodes and are usually much larger in size. See FIG. 9.

Figure 10:
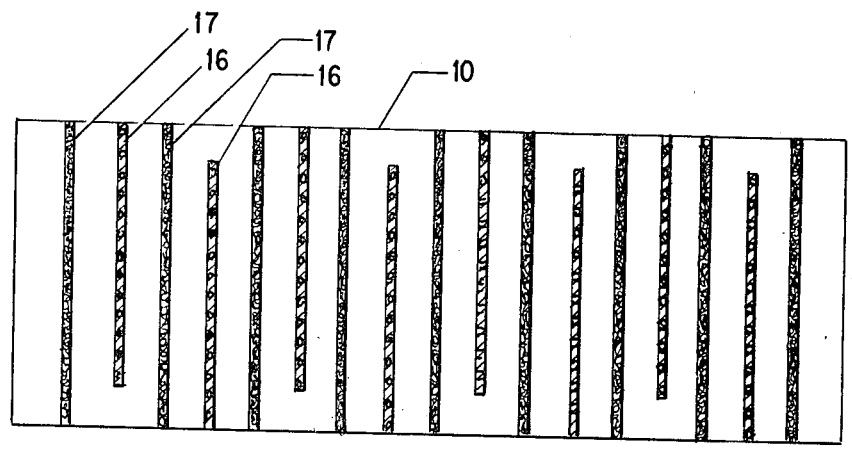
Figure 11:
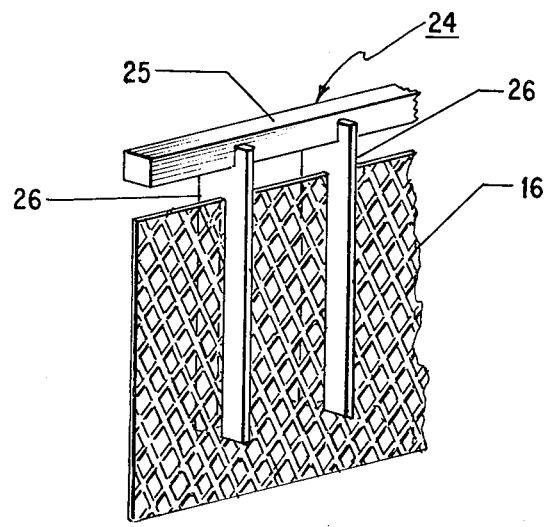

The present invention also contemplates the use of alternating reticulate cathodes and solid anodes wherein the solid anodes either extend less than the total cross-sectional area of the cell box to create an area deficiency, or contain a hole(s) for the same purpose. Said anode area deficiency can be located either on a side (laterally) or on the top and/or bottom (horizontal area deficiency) of each solid anode. Such solid anode area deficiency is alternated, e.g., left, right, left, right (when lateral) or top, bottom, top, bottom (where horizontal). See FIG. 10 which illustrates the use of both lateral (when viewed as a top plane view) or horizontal (when used as a side or sectional view) area deficiencies. FIG. 11 illustrates the use of alternating holes to create areas of solid anode deficiency. Both of these structural embodiments enable the electrolyte to follow a sinuous path around the solid anodes and through the reticulate cathodes.

The present invention likewise contemplates the use of lateral or horizontal area deficiencies or holes in the reticulate cathodes to prevent the overflow of the electrolyte in the cell box when the reticulate electrodes or some of them become plugged.

One or more porous filters, e.g., porous organic, ceramic, etc. (not shown), can be employed preferably within the cell box at the inlet portion thereof in order to remove suspended particulate or flocculent matter from the cell. One or more of these filters can be grooved to allow for liquid by-pass in the event of plugging of one or more reticulate cathodes. These filters can then be removed and replaced without disturbing cell operation.

In addition to polyurethane foams, other organic polymer foams can be employed at the substrates for the reticulate cathodes in accordance with this invention. Hence, such organic polymer foams as polyolefins, e.g., polyethylene, polypropylene, etc.; polyvinyl chloride; etc. Such organic polymer foam substrates can be metallized by using metallization techniques known in the art. The thus metallized organic polymer foam substrates can be used as such or then can have electrolytic metal coatings deposited thereon in a manner similar to that indicated above for the electrolessly metallized polyurethane foam substrates.

In order to prevent localized short circuits due to electroconductive, e.g., metallic debris present in the bottom portions of cell box 10, the anodes can be raised from the bottom of the cell box to prevent shorting using plastic strips which can be included as inserts in the bottom of the cell box or which can be molded intrically therein. These strips or ledges (not shown) serve to elevate the anodes and oviate such localized shorting.

In accordance with this invention, one or more air spargers can be employed to enhance liquid movement and more evenly distribute the contact between the waste water to be treated and the electrodes contained within the cell box. Thus a plurality of horizontally disposed air sparger pipes containing openings spaced along the extent thereof can be used (not shown) in order to accomplish the foregoing. It has been observed that the use of such air spargers enhances the metal removal achieved utilizing the device of this invention.

In accordance with one embodiment of this invention, as shown in FIG. 11, nonconductive separator means which spans the width of the cell box 10 can be employed to maintain separation between the cell anodes and cathodes. As illustrated in FIG. 11, the separator means 24 has an upper member 25 which spans the width and a plurality of lower fork-shaped members 26 which are disposed over the top of the cell anodes. Both upper member 25 and the fork-shaped members 26 can be made of nonconductive, e.g., plastic material, such as, polyvinyl chloride, polyethylene, polypropylene, nylon, polytetrafluoroethylene, etc.

While anode busbar 19 (and the corresponding cathode busbar 20) are shown in FIG. 1 to be of a bent 90° channel configuration, it is within the purview of this invention to employ busbars of varying geometric configurations, e.g., rectangular busbars that is those which are rectangular in cross-section with a solid or hollow can be utilized.

It is also within the purview of this invention to utilize an overflow weir to serve as an indicator for the flow rate measurement at the outlet side of the cell box. For example, a notch can be cut in outlet pipe (standpipe) 14 to serve as a visual indicator for a rough estimation of a flow rate occuring within the cell box. Alternatively, standpipe 14 can be replaced by a sheet which would extend to the bottom and both lateral sides of the box and serve as an overflow weir for the same purpose.

It has been learned that a very wide mesh type of expanded metal anode can be used in accordance with the cell of this invention. Thus substantial economies in metal and in metal coating costs can be employed for anodes in conjunction with this invention by using expanded metal mesh anodes having a long width dimension of up to about 3 inches combined with a short width dimension of up to about 1½ inch compared to conventional expanded metal anodes currently used in electrolytic cells which have approximately a ½ inch long width dimension along with a comparable ¼ inch short width dimension.

Figure 12:
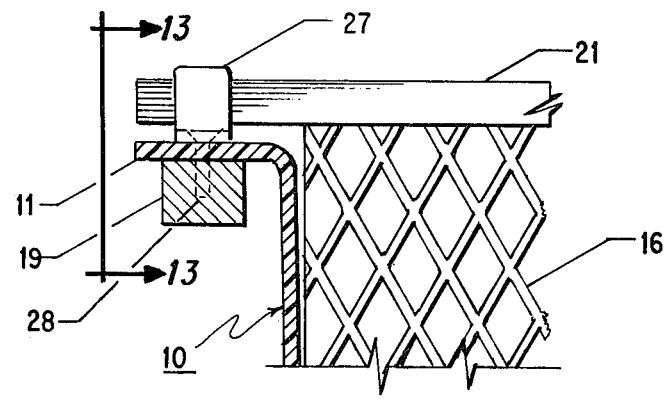
Figure 13:
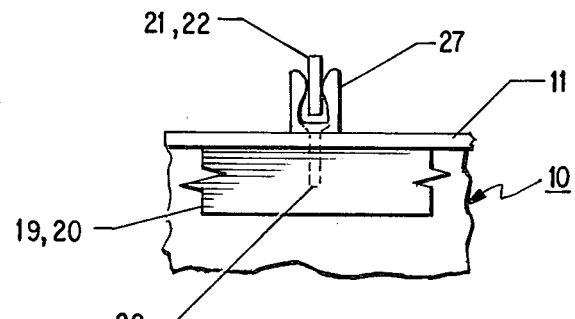

In place of connecting members 23 as shown in FIG. 1 to connect the upper connector portions of the anodes or cathodes, respectively, to their appropriate busbar; a fuse clip connection means 27 can be employed. As shown in FIGS. 12 and 13, fuse clip 27 can be bolted or otherwise secured through ledge 11 of the cell box to the appropriate anode busbar 19 or cathode busbar 20 by bolts 28. When such an arrangement is employed, the upper connector portion 21 or 22, respectively, merely slips into contact through the open portion provided by the spring-like fuse clip members 27 as shown, for example, in FIG. 13. Such construction permits ready insertion and removal of electrodes.

Figure 14:
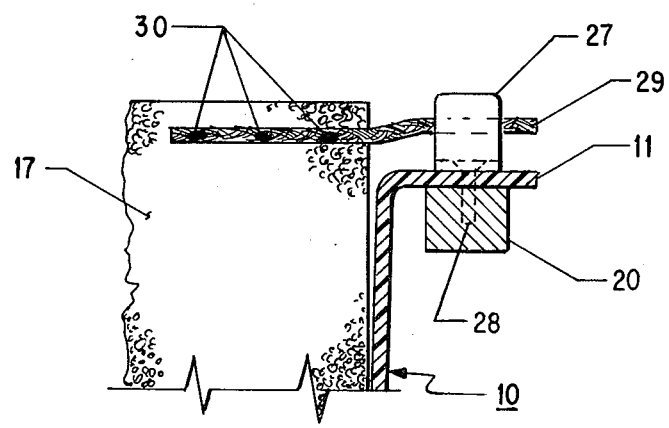

Likewise in accordance with this invention, the various reticulate cathodes can be connected to the fuse clips, the type shown in FIGS. 12 and 13, utilizing braided conductive metal strips 29 soldered to the cathodes 17 at soldering points 30 as shown in FIG. 14. The end of metal braid 29 is then inserted into the open portion of spring-like fuse clips 27 to secure it therein. Other equivalent means such as aligator clips can be utilized in combination with connector wires of the type shown at 23 in FIG. 1 to accomplish the same purpose, viz., connection of the appropriate electrode to its busbar.

SYSTEM ANODES

While the foregoing description in conjunction with the drawing mentions that the cathodes 17 are reticulate metallized organic polymer foam cathodes, it should be understood also in accordance with the device of this invention, the anodes 16 can similarly be metallized organic polymer foam reticulate electrodes. On the other hand, at least one, more, or all the anodes 16 can be made of graphite or lead having openings or perforations to allow flow of waste water through the anodes. Additionally, at least one, more, or all anodes 16 can of the dimensionally stable type, e.g., expanded metal mesh, which can be made of titanium, or other valve metal substrate, with precious metal and/or metal oxide coatings of tantalum, iridium, rhodium, ruthenium, platinum, etc., with or without nonprecious metal oxide(s), e.g., manganese dioxide and/or lead dioxide.

RETICULATE ELECTRODES

The open cell organic polymer foam substrate which is used should be one having mostly interconnected pores, viz., of the open cell type. Suitable organic polymer foam substrate materials which can be employed include, but are not necessarily limited to, polyurethane foam, the open cell polyurethane foams such as Scott Industrial Foam, Q version; Scott Industrial Foam, PVC coated; Scottfelt foam; reticulated carbon; polyether urethane foam; polyester urethane foam; etc.

The organic polymer foam substrate material can have pore sizes ranging from about 10 to about 100 mils, viz., 0.010 to about 0.100 inch. Usually, however, the average pore size of the interconnecting cell organic polymer foam substrate ranges from about 20 to about 40 mils, viz., 0.020 to about 0.040 inch. The size referred to as "pore size" is the average diameter of the foam pores prior to the first, viz., electroless, deposition procedure. Such foam substrates characteristically contain from about 20 to about 45+ pores per inch (ppi).

RETICULATE ELECTRODE PLATING

(1) Nickel Reticulate Electrode Fabrication

A variety of metals can be plated upon the open cell organic polymer foam substrate. Thus such metals as copper, nickel, palladium, platinum, silver, gold, iron, zinc, cobalt, etc., and alloys thereof can be deposited first electrolessly then electrolytically.

A variety of metallized reticulate organic polymer foam electrodes can be utilized in the device of this invention. Typically exemplary copper metallized and nickel metallized organic polymer foam electrodes can be made as indicated below. It should be noted, however, that the cell device of this invention is particularly well-suited for use with a wide variety of reticulated electrodes and can utilize any reticulate cathode(s), e.g., reticulate carbon, metal mesh, etc., alone or in conjunction with reticulate electrodes of metallized organic polymer foam.

The organic polymer foam, e.g., polyurethane, substrate, Scott Industrial Foam (Q version), has a layer of nickel deposited electrolessly thereon by immersion into the electroless nickel plating bath for time periods ranging from about 2 to 60 minutes of temperatures ranging from about 15° C. to about 60° C. Usually, however, the electroless deposition of nickel is applied by immersing the organic polymer foam substrate in the electroless plating bath from 5 to 10 minutes at temperatures from ambient room temperature, viz., about 20° C., to about 50° C.

Prior to immersing the polyurethane foam into the electroless nickel plating bath, it is treated with a sensitizing material, and then a catalyzing material to render it receptive to deposition of the electroless nickel plating. Thus, the polyurethane substrate is immersed at room temperature into a sensitizing solution of an aqueous nature containing stannous chloride and hydrochloric acid in water, it is thoroughly rinsed, it is immersed into a catalyzing solution of an aqueous nature containing palladium chloride and hydrochloric acid in water, it is thoroughly rinsed, then it is ready for the electroless nickel deposition. Characteristically, the polyurethane substrate is immersed into the sensitizing bath and the catalyzing bath for 2 to 10 minutes at ambient temperature. Typically, the sensitizing bath contains from 5 to 15 grams per liter of anhydrous stannous chloride, viz., $SnCl_2$, and from 0.005 to 0.015 gram per liter of hydrochloric acid, viz., HCl. The catalyzing bath contains from 0.2 to 1.0 gram per liter of palladium chloride, viz., $PdCl_2$, and from 0.005 to 0.015 gram per liter of hydrochloric acid, viz., HCl.

Then as noted the prepared organic polymer foam substrate is immersed into the electroless bath customarily maintained at ambient to slightly elevated temperatures, e.g., from 20° C. to about 60° C. The electroless plating bath is composed of two components, one containing nickel chloride, ammonium chloride, sodium citrate and ammonium hydroxide and the other component characteristically contains sodium hypophosphite and water. The electroless plating bath is prepared suitably by first adding the nickel chloride, viz., NiCl- 2·6H$_2$O, the ammonium chloride, the sodium citrate and the ammonium hydroxide to the water and the mixture is throughly agitated to obtain dissolution of the components therein. Then the sodium hypophosphite is added to water and agitated to obtain dissolution. Both baths are added together to obtain the nickel electroless plating bath. Characteristically, the electroless plating bath contains from 40 to 50 grams per liter of the hydrated nickel chloride, 45 to 55 grams per liter of ammonium chloride, from 95 to 105 grams per liter of the sodium citrate, from 250 to 275 grams per liter of ammonium hydroxide, and from about 10 to 20 grams per liter of the sodium hypophosphite.

The organic polymer foam substrate as indicated above is electrolessly plated using conventional electroless plating baths for nickel plating followed by electrolytic plating using conventional nickel electroplating baths. The constituents of this electrolytic bath are nickel sulfate and boric acid. Anti-pitting agents can be used to control pitting of the deposits, and agitation is recommended during deposition. Consumable nickel anodes were used to maintain the bath compositions. A typical composition and range and operating conditions are as follows:

|  | Range (g/l) | Nominal Value (g/l) |
|---|---|---|
| Nickel sulfate (NiSO$_4$.6H$_2$O) | 225–375 | 330 |
| Boric acid (H$_3$BO$_3$) | 30–40 | 37 |
| Temperature °C. | 45–65 | 60 |
| pH | 4.0–6.0 | 4 |
| Current density | 25–100 amp/ft$^2$ | 50 |

(2) Copper Reticulate Electrode Fabrication

The polyurethane foam substrates can be metallized with copper electrolessly then electrolytically in a similar manner. The organic polymer foam, e.g., polyurethane, substrate can have a layer of copper deposited electrolessly thereon by immersion into an electroless copper plating bath for time periods ranging from 2 to 25 minutes at ambient temperatures. Typically, the electroless deposition of copper is applied by immersing the organic polymer foam substrate in the electroless plating bath from 15 to 25 minutes at room temperatures, viz., 15° to 30° C.

Prior to immersing the polyurethane foam in the electroless copper plating bath, it is treated with a sensitizing material and then a catalyzing material to render it receptive to deposition of the electroless copper plating. Thus, the polyurethane substrate is immersed at room temperature into a sensitizing solution of an aqueous nature containing stannous chloride and hydrochloric acid in water, it is thoroughly rinsed, it is immersed into a catalyzing solution of an aqueous nature containing palladium chloride and hydrochloric acid in water, it is thoroughly rinsed, then it is ready for the electroless copper deposition. Characteristically, the polyurethane substrate is immersed into the sensitizing bath and the catalyzing bath for 2 to 10 minutes at ambient temperature. Typically, the sensitizing bath contains from 5 to 15 grams per liter of anhydrous stannous chloride, viz., SnCl$_2$, and from 0.005 to 0.015 gram per liter of hydrochloric acid, viz., HCl. The catalyzing bath contains from 0.2 to 1.0 gram per liter of palladium chloride, viz., PdCl$_2$, and from 0.005 to 0.015 gram per liter of hydrochloric acid, viz., HCl.

Then as noted, the prepared organic polymer foam substrate is immersed into the electroless bath customarily maintained at ambient temperatures, viz., 15° to 30° C. The electroless plating bath consist of cupric sulfate pentahydrate, sodium-potassium tartrate, formaldehyde, and sodium hydroxide. The copper electroless plating bath is prepared suitably by adding the aforementioned components to water in which the mixture is agitated to obtain thorough dissolution of the components. Characteristically, the electroless plating bath contains from 10 to 15 grams per liter of cupric sulfate pentahydrate, from 50 to 55 grams per liter of sodium potassium tartrate, from 8 to 13 grams per liter of sodium hydroxide, and from 18 to 23 grams per liter of formaldehyde.

The organic polymer foam substrate as indicated above is electrolessly plated using the above-stated conventional electroless plating bath for copper electroless plating followed by electrolytic plating using a conventional copper electroplating baths such as the acid-sulfate copper bath. The constituents of this bath are cupric sulfate pentahydrate and sulfuric acid. Hardening and brightening agents can be used to control the deposit, and agitation is recommended. Consumable copper anodes are requied to maintain bath compositions. A typical composition range and operating conditions are as follows:

| Constituent | Range | Nominal Value |
|---|---|---|
| Cupric Sulfate Pentahydrate g/l CuSO$_4$.5H$_2$O | 35–45 | 40 |
| Sulfuric Acid g/l H$_2$SO$_4$ | 10–25 | 15 |
| Temperature °C. | 15–30 | 20 |
| Current Density amp/ft$^2$ | 25–100 | 75 |
| Plating Time min | 30–60 | 45 |

In the aforementioned baths, e.g., the copper electroless and the acid sulfate copper baths, suitable copper reticulate electrodes containing approximately 1.5 grams of copper per in$^3$ (0.24 gram per cc of foam substrate) were fabricated for use as the cathodes in the reticulate electrode metals removal system. Characteristically the Cu or other metal plating ranges from about 0.1 to about 0.3 gram/cc.

Six specific examples are presented in which reticulate electrodes were employed to remove metal wastes and oxidize cyanide in dilute rinse waters utilizing the electrolytic cell device of FIG. 1 with varying numbers and types of anodes in combination with metallized organic polymer foam cathodes. Where current and voltage ranges are given, the upper limits of these ranges were used for the calculations of current efficiency, current density and power consumption per amount of metal removed. In the examples, all parts, percents and ratios are by weight unless otherwise indicated. All metal concentrations were determined using standard atomic absorption techniques. Cyanide and cyanate concentrations (where applicable) were determined according to titration methods known in the art.

EXAMPLE 1

Acid Copper Rinse Water Treatment

The reticulate electrode cell system has been used for the removal of copper from a platers' effluent rinse water stream. The metal cation, $Cu^{2+}$, was plated out as a neutral metal onto the cathode. The conjugate anion, $SO_4^{2-}$, was left untreated during these tests. The anode electrochemical reaction was the evolution of oxygen with the subsequent protonation of the rinse water solution.

The tests were conducted for a minimum of 200 hours on line. The flow rate of the rinse water solution through the system was 2 gallons per minute in which the system was operated in the single pass mode with the average metal cation inlet concentration of 160 ppms producing an average outlet metal cation concentration of 14 ppms.

The type of reticulate cathode employed was the copper plated reticulate polyurethane foam electrode, prepared as described above by electrolessly then electrolytically plating Scott Industrial Foam (Q version), ¼ inch thick with an average pore size of 33 mils, more commonly referred to as the 30 pores per linear inch (30 ppi) type. The area of plate of one side onto the reticulate cathodes was 0.95 ft² and 37 such cathodes were used in the cell for the tests. Forty-one TIR-2000 ® dimensionally stable electrodes were employed as the anodes. Similarly, the active area of the anodes on one side was 0.95 ft². Characteristically, the TIR-2000 anodes consist of an 0.060 inch thick titanium expanded mesh substrate coated with the oxides of tantalum, iridium and titanium.

Figure 2:
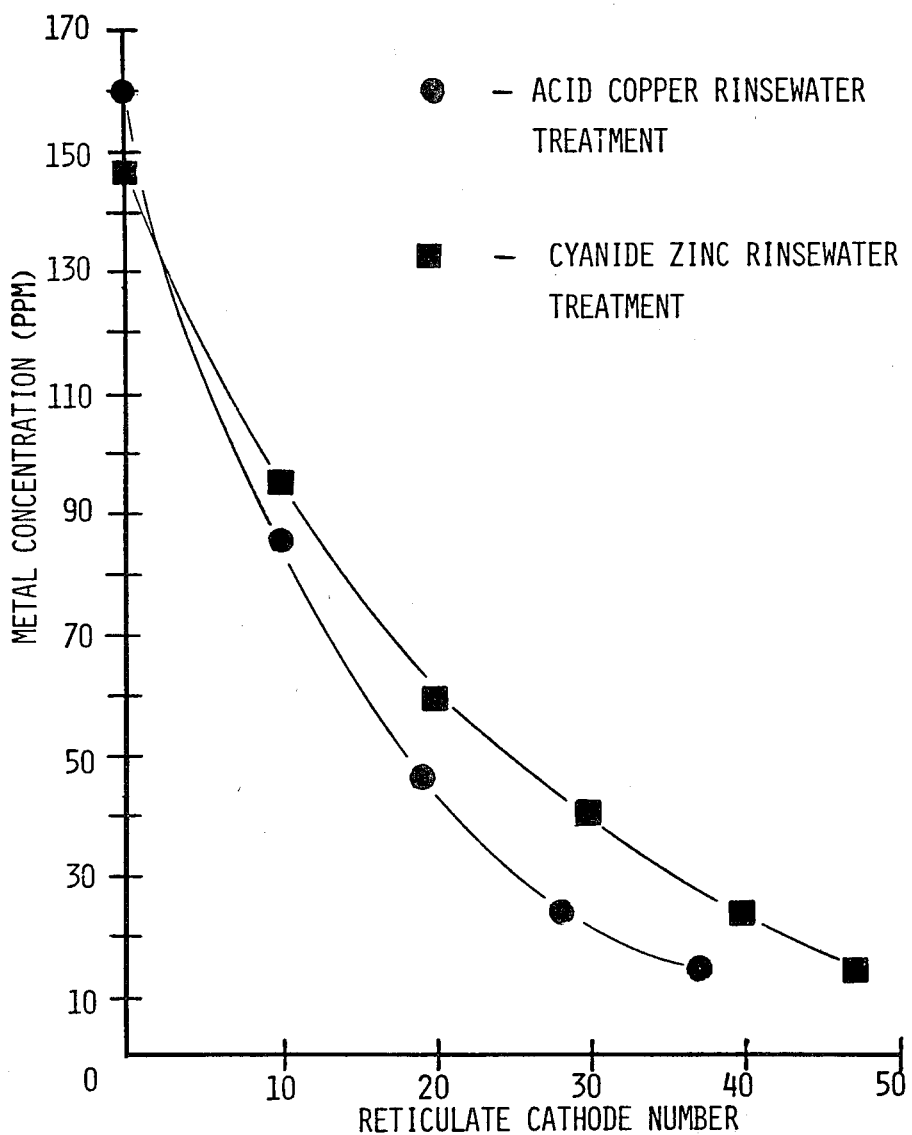
FIG. 2 is a plot of metal concentration versus number of reticulate cathodes for the acid copper and cyanide zinc rinse water treatment systems.

For this particular system, the cathode lifetime was 200 hours producing an average uptake weight of 1.10 lbs copper per cathode. The cell current for the system ranged from 100 to 130 amps producing a cathode current density range of 3.1 to 3.7 amps/ft² (3.0 to 3.5 A/cathode) based on the area of plate of one side of a cathode. A resulting voltage range of 2.1 to 2.7 volts, a resulting DC power consumption not greater than 2.4 kilowatt-hrs/lb of metal removed, and a resulting current efficiency of 43 percent occurred. The average pH into the cell was 3.2 and the average pH out of the cell was 2.1. FIG. 2 illustrates the metal concentration for the copper removal system as a function of reticulate cathode number at the above operating conditions. The average metal removal efficiency of the system was 91 percent.

EXAMPLE 2

Cyanide Zinc Rinse Water Treatment

The reticulate electrode cell system has been used for the removal of zinc from a platers' effluent rinse water stream. The metal cation, $Zn^{2+}$, was plated out as a neutral metal onto the cathode. The conjugate anion, $CN^-$, was left untreated during these tests. The anode electrochemical reaction was the evolution of oxygen with the subsequent protonation of the rinse water solution. The tests were conducted for a minimum of 100 hours on line. The flow rate of the rinse water solution through the system was 2 gallons per minute in which the system was operated in the single pass mode, with the average metal cation inlet concentration of 147 ppms producing an average outlet metal cation concentration of 15 ppms. The type of cathode employed was the copper plated reticulate polyurethane electrode, as in Example 1, ¼ inch thick with an average pore size of 33 mils, more commonly referred to as the 30 pores per linear inch (30 ppi) type. The area of plate of one side onto the reticulate cathodes was 1.40 ft² and 46 cathodes were used in the cell for the tests. Fifty-one graphite electrodes were employed as the anodes. Similarly, the active area of the anodes on one side was 1.40 ft². Characteristically, the graphite electrodes were cut from an extruded block of graphite and fabricated into plates in which holes were drilled to allow solution flow through them.

For this particular system, the cathode lifetime was 100 hours producing an average uptake weight of 0.66 lbs of zinc per cathode. The cell current for the system ranged from 550 to 600 amps producing a cathode current density range 8.5 to 9.3 amps/ft² (12 to 13 A/cathode) based on the area of plate of one side of a cathode. A resulting voltage rnge of 4.0 to 5.5 volts, a resulting DC power consumption not greater than 25 kilowatt-hrs/lb of metal removed, and a resulting cathode plating efficiency of 8.2 percent occurred. The average pH into the cell was 12.5 and the average pH out of the cell was 12.2. FIG. 2 illustrates the metal concentration for the zinc removal system as a function of reticulate cathode number at the above operating conditions. The average metal removal efficiency of the system was 90 percent.

EXAMPLE 3

Cadmium Cyanide Rinse Water Treatment

The reticulate electrode cell system has been used for the concurrent removal of cadmium and the oxidation of cyanide to cyanate in a simulated rinse solution. The metal cation, $Cd^{2+}$, was plated out as a neutral metal onto the cathode, and the conjugate anion, $CN^-$, was oxidized to cyanate, $CNO^-$, at the anode.

The tests were conducted as batch operations on the lab scale for 200 minutes with a batch size of 4 gallons (15 liters). The flow rate of the simulated rinse was one gallon per minute in which the system was operated in the recirculating mode with 50 passes made of the system reservoir (4 gal). The initial $Cd^{2+}$ concentration was 141 ppms and the final $Cd^{2+}$ concentration was 0.02 ppm. The initial $CN^-$ concentration was 270 ppms and the final $CN^-$ concentration was 8 ppms with a $CNO^-$ concentration of 395 ppms. The pH was initially set at 12.0 by NaOH addition to the reservoir, and it decreased to 11.8 at the end of the run.

Figure 3:
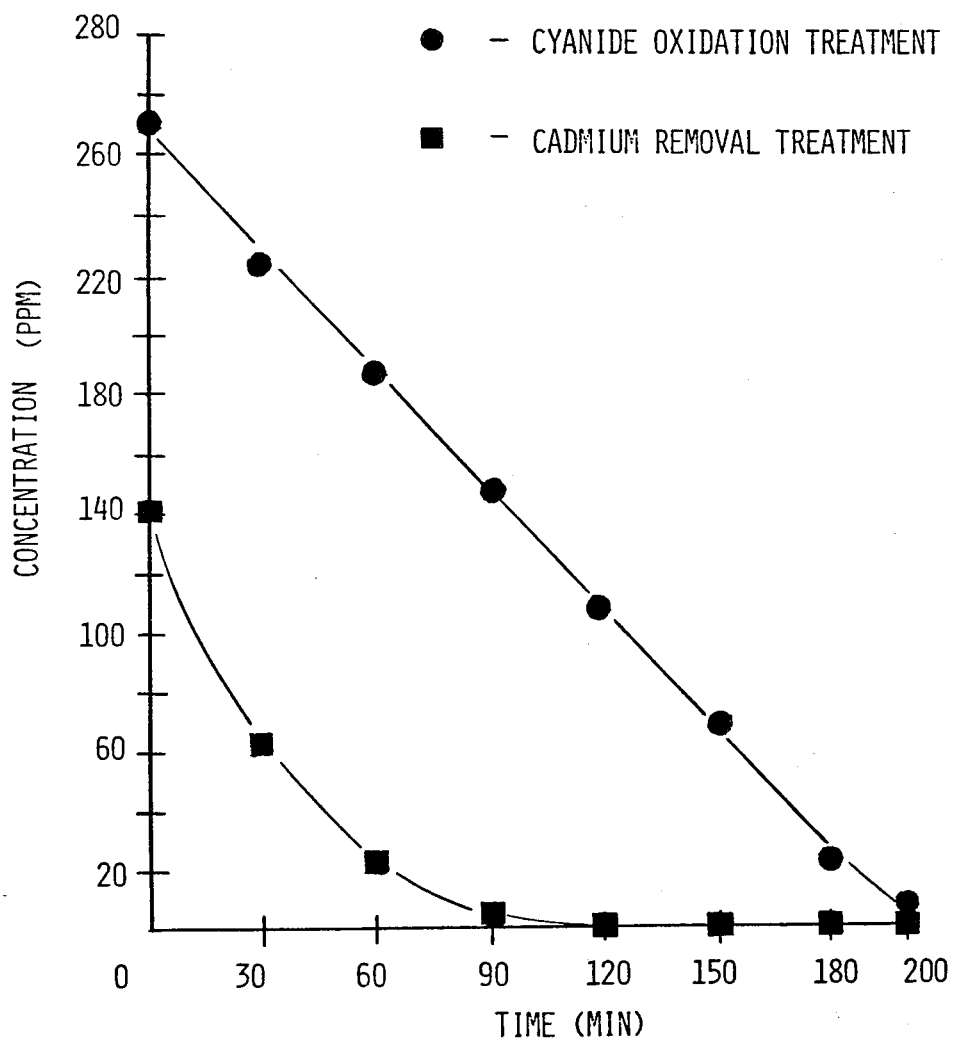
FIG. 3 is a plot of metal and cyanide concentration versus treatment time for the cadmium cyanide treatment system.

The type of cathode employed was the copper plated reticulate polyurethane electrode, as in Example 1, ¼ inch thick with an average pore size of 33 mils. The area of plate on one side of the reticulate cathodes was 0.16 ft² and 3 cathodes were used in the cell for these tests. Four 30 ppi nickel plated polyurethane electrodes, prepared as described above by electrolessly then electrolytically plating Scott Industrial Foam (Q version), ¼ inch thick, with a facial area of 0.16 ft² each, were used as the anodes. The cell current for the system was 3 amps producing a cathode current density of 6.1 amps/ft² (1.0 amps/cathode) based on the facial area of one side of an electrode. This cell current produced a cell voltage of 2.4 volts. Additionally, the cathode plating current efficiency was 10 percent, the anode cyanide oxidizing current efficiency was 81 percent and the DC power consumption of the cell was 0.006 kilowatt-hr/gal of batch. FIG. 3 illustrates the $Cd^{2+}$ and $CN^-$ concentrations as a function of time for the runs. The cadmium metal removal efficiency was +99 percent and the cyanide oxidation efficiency was +95 percent.

EXAMPLE 4

Watts Nickel Rinse Water Treatment

The reticulate electrode cell system has been used for the removal of nickel in a simulated rinse solution. The metal cation, $Ni^{2+}$, was electrochemically plated out as a neutral metal onto the cathode, and the conjugate anions, $Cl^-$ and $SO_4^{2-}$, were left untreated for these tests. The anode electrochemical reaction was the evolution of oxygen with the subsequent protonation of the rinse solution.

Figure 4:
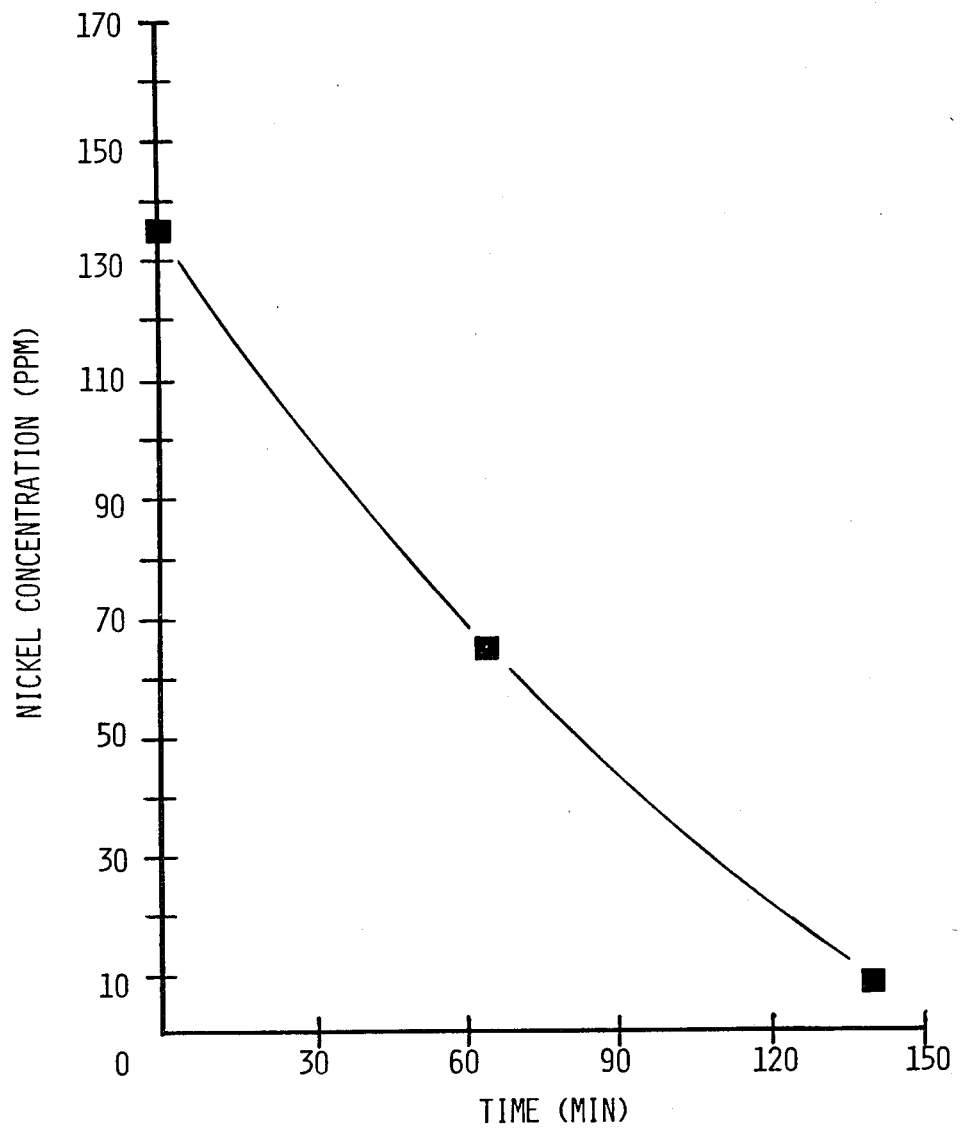
FIG. 4 is a plot of metal concentration versus treatment time for the Watts Nickel rinse water treatment system.

The tests were conducted as batch operations on the lab scale for 150 minutes with a batch size of 4 gallons (15 liters). The flow rate of the simulated rinse was one gallon per minute in which the system was operated in the reciculating mode with 37 passes made of the system reservoir (4 gal). The initial concentration was 135 ppm, and the final concentration was 8 ppms. the pH of the system was held in the range of 4 to 7 by use of a pH controller. To improve the conductivity of the rinse solution, ammonium sulfate, $(NH_4)_2SO_4$, was added to the reservoir at the concentration of 5 grams/liter. The type of cathode employed was the copper plated reticulate polyurethane electrode, as in Example 1, ¼ inch thick with an average pore size of 33 mils (30 ppi foam). The area of plate of one side onto the reticulate cathodes was 0.16 ft² and 3 cathodes were used in the cell for these tests. Four dimensionally stable TIR-2000 electrodes (as in Example 1) were employed as the anodes. The active facial area of the anodes was 0.16 ft² based on one side of the anode (0.32 ft²/anode). The cell current was 4.8 amps producing a cathode current density of 10 amps/ft² (1.6 amps/cathode) based on the facial area of plate on one side of a cathode. This produced a cell voltage of 4.0 volts. Additionally the cathode plating current efficiency was 14 percent, and the DC power consumption of the cell per pound of metal removed was 11 kilowatt-hrs/lb of nickel removed. FIG. 4 illustrates the nickel concentration as a function of time for the runs. The nickel metal removal efficiency was 94 percent.

EXAMPLE 5

Ammoniacal Copper Etchant Rinse Water Treatment

The reticulate electrode cell system has been used for the removal of copper in a simulated rinse solution. The metal cation, $Cu^{2+}$, was electrochemically plated out as a neutral metal onto the cathode, and the conjugate anion, $Cl^-$, was left untreated for these tests. The anode electrochemical reaction was the evolution of oxygen with the subsequent protonation of the rinse solution.

Figure 5:
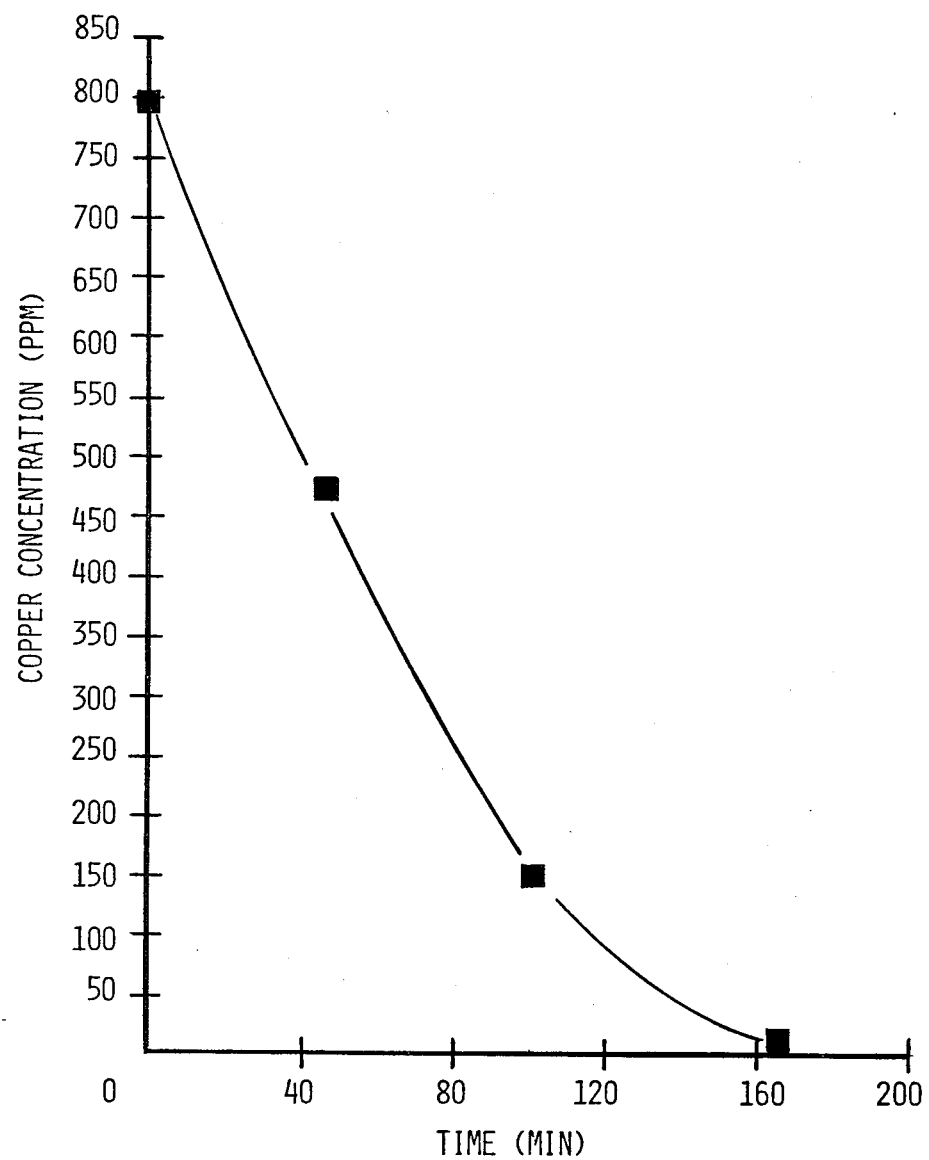
FIG. 5 is a plot of copper concentration versus treatment time for the ammoniacal copper etchant rinse water treatment system.

The tests were conducted as batch operations on the lab scale for 165 minutes with a batch size of 3.2 gallons (12 liters). The flow rate of the simulated rinse was ½ gallon per minute in which the system was operated in the recirculating mode with 28 passes made of the system reservoir (3.2 gal). The initial concentration was 790 ppm, and the final concentration was 12 ppm. the pH of the system was initially 10.0 dropping to a final pH of 9.5. The type of cathode employed was the copper plated reticulate polyurethane electrode, as in Example 1, ¼ inch thick with an average pore size of 33 mils (30 ppi foam). The area of plate of one side onto the reticulate cathodes was 0.16 ft² and 3 cathodes were used in the cell for these tests. Four TIR-20000 electrodes (as in Example 1) were employed as the anodes. The active facial area of the anodes was 0.16 ft² based on one side of the anode (0.32 ft²/anode). The cell current was 4.8 amps producing a cathode current density of 10 amps/ft² (1.6 amps/cathode) based on the facial area of plate on one side of a cathode. This produced a cell voltage of 3.6 volts. Additionally the cathode plating current efficiency was 60 percent, and the DC power consumption of the cell per pound of metal removed was 2.3 kilowatt-hrs/lb of copper removed. FIG. 5 illustrates the copper concentration as a function of time for the runs. The copper metal removal efficiency was 98 percent.

EXAMPLE 6

Electroless Copper Rinse Water Treatment

The reticulate electrode cell system has been used for the removal of copper in a simulated rinse solution. The metal cation, $Cu^{2+}$, was electrochemically plated out as a neutral metal onto the cathode with the conjugate anions and chelating agents left untreated for these tests. The anode electrochemical reaction was the evolution of oxygen with the subsequent protonation of the rinse solution.

Figure 6:
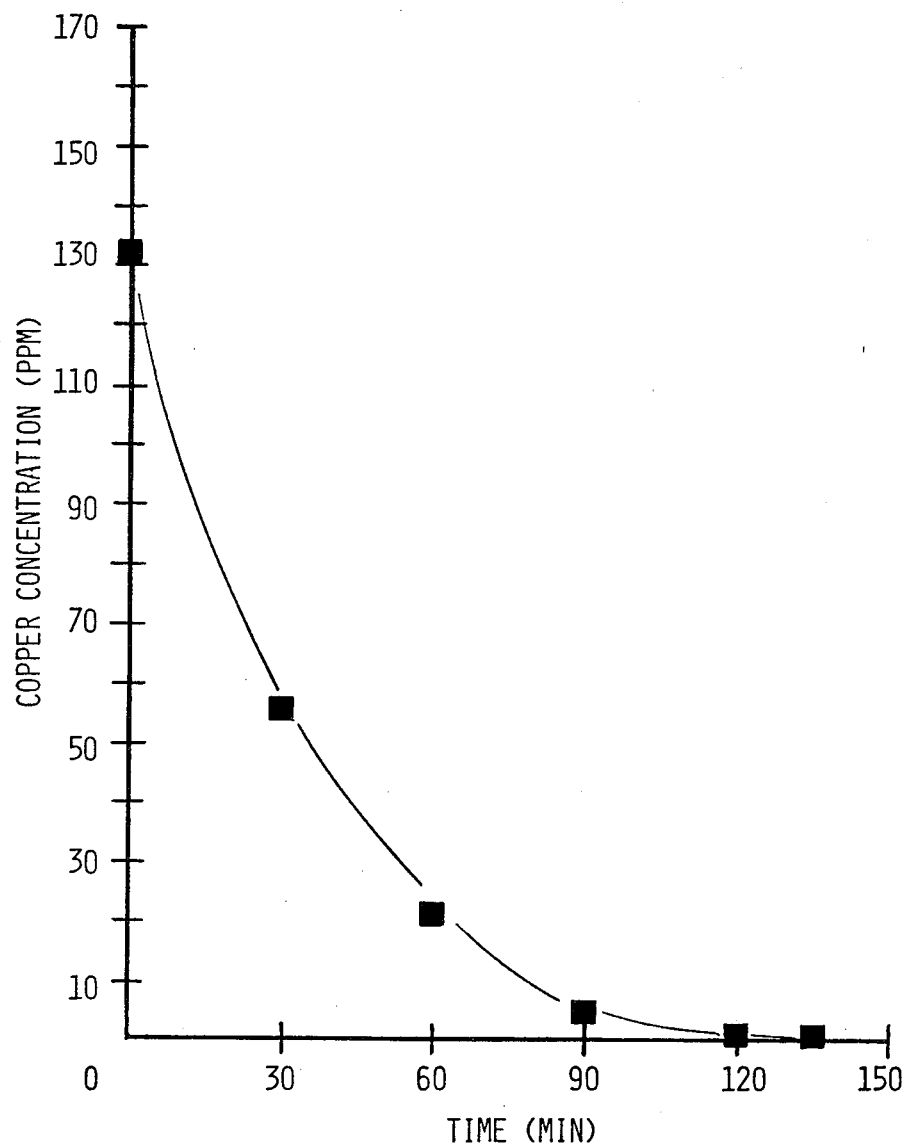
FIG. 6 is a plot of copper concentration versus treatment time for the copper electroless rinse water treatment system.

The tests were conducted as batch operations on the lab scale for 135 minutes with a batch size of 4 gallons (15 liters). The flow rate of the simulated rinse was one gallon per minute in which the system was operated in the recirculating mode with 37 passes made of the system reservoir (4 gal). The initial concentration was 132 ppm, and the final concentration was 1.2 ppm. The pH of the system was initially 5.3 dropping to a final pH of 3.6. The type of cathode employed was the copper plated, reticulate polyurethane electrode, as in Example 1, ¼ inch thick with an average pore size of 33 mils (30 ppi foam). The area of plate of one side onto the reticulate cathodes was 0.16 ft² and 3 cathodes were used in the cell for these tests. Four TIR-2000 electrodes (as in Example 1) were employed as the anodes. The active facial area of the anodes was 0.16 ft² based on one side of the anode (0.32 ft²/anode). The cell current was 3 amps producing a cathode current density of 6.3 amps/ft² (one amp/cathode) based on the facial area of plate on one side of a cathode. This produced a cell voltage of 3.8 volts. Additionally, the cathode plating current efficiency was 22 percent, and the DC power consumption of the cell per pound of metal removed was 6.2 kilowatt-hrs/lb of copper removed. FIG. 6 illustrates the copper concentration as a function of time for the runs. The copper removal efficiency was 99 percent.

We claim:

1. A membrane or diaphragm-free electrolytic cell for removal of a metal(s) present as a contaminant(s) in waste water comprising a nonconductive cell box having an upper peripheral flange, anode and cathode bus bars located on said cell box enternally of the cell box, and below said flange, box inlet and outlet means to pass the liquid through electrodes contained in said box, means to space anodes and cathodes contained within said cell box one from the other, a plurality of reticulate cathodes, and means connecting the anodes and cathodes, respectively, to said bus bars and the bus bars to a source of electrical energy whereby the metal contaminant(s) present in such water are deposited on the reticulate cathodes, the spacers being electrically nonconductive and being at least one of peripheral protrusions vertically along the sides of the box and along the bottom of the box, bars affixed to upper surfaces of the anodes and having at least two tongues extending vertically downward along surfaces of the anodes, and snaps affixed to the anodes.

2. An electrolytic cell as in claim 1 wherein at least one of said reticulate cathodes is comprised of an organic polymer foam substrate containing an electroless then electrolytic deposit of metal or alloy thereof on and within the pores of said foam.

3. An electrolytic cell as in claim 2 wherein said metal deposit is copper.

4. An electrolytic cell as in claim 2 wherein said metal deposit is nickel.

5. An electrolytic cell as in claim 2 wherein a plurality of said anodes and a plurality of said cathodes are arranged in alternating manner within said cell.

6. An electrolytic cell as in claim 1 wherein said cathode substrate is polyurethane foam.

7. An electrolytic cell as in claim 1 wherein at least one of said anodes is a dimensionally stable anode.

8. An electrolytic cell as in claim 7 wherein the dimensionally stable anode has a titanium substrate.

9. An electrolytic cell as in claim 1 wherein at least one of said anodes is lead.

10. An electrolytic cell as in claim 1 wherein at least one of said anodes is graphite.

11. An electrolytic cell as in claim 1 wherein at least one of said anodes is comprised of an organic polymer foam open cell substrate having mostly interconnecting pores upon which there is deposited electrolessly then electrolytically a metal or alloy thereof.

12. An electrolytic cell as in claim 1 wherein said connecting means include terminal connectors connecting each anode with an anode bus bar located on one side of said cell box and each cathode with a cathode bus bar located on another side of said cell box.

13. An electrolytic cell as in claim 12 wherein each anode and cathode has a conductive contact bar with extension in contact with its upper portion, each said contact bar extension resting on said cell box upper peripheral flange.

14. An electrolytic cell as in claim 1 wherein said means to space is comprised of a plurality of individual nonconductive spacers.

* * * * *

UNITED STATES PATENT AND TRADEMARK OFFICE
CERTIFICATE OF CORRECTION

PATENT NO. : 4,399,020

DATED : Aug. 16, 1983

INVENTOR(S) : Branchick et al

It is certified that error appears in the above-identified patent and that said Letters Patent are hereby corrected as shown below:

In claim 1, at line 56 of column 14, delete "enternally" and insert --externally--.

Signed and Sealed this

Twentieth Day of March 1984

[SEAL]

Attest:

*Attesting Officer*

GERALD J. MOSSINGHOFF

*Commissioner of Patents and Trademarks*